(No Model.)
A. WISSLER.
CASING FOR ELECTRIC SWITCHES.
No. 458,880. Patented Sept. 1, 1891.
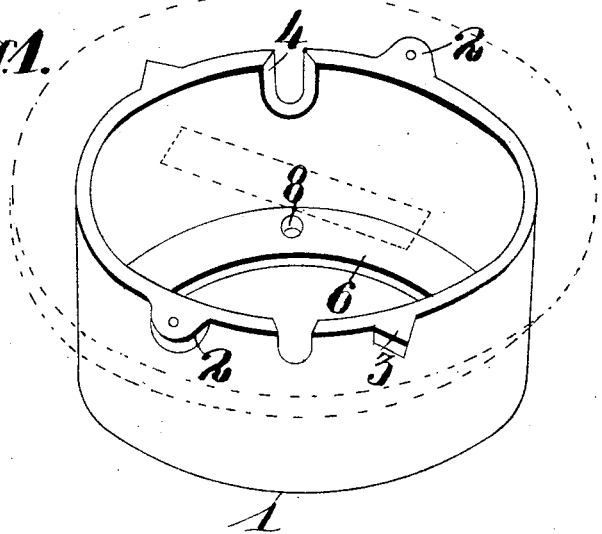
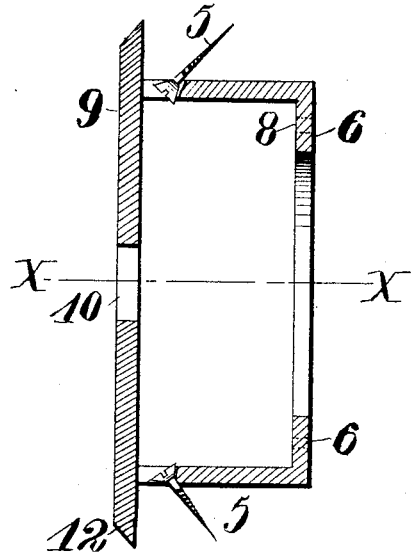
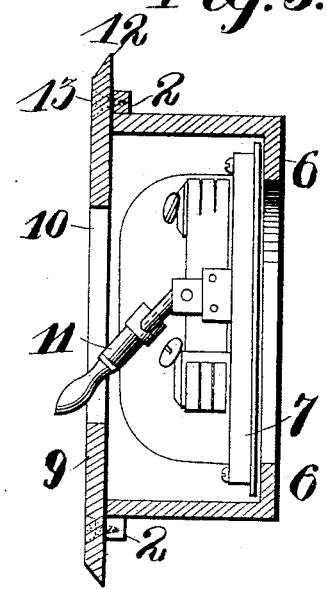
WITNESSES
A. A. Eick
C. F. Heller
INVENTOR
Adolph Wissler
Hjden & Hjden
Attorneys

UNITED STATES PATENT OFFICE.

ADOLPH WISSLER, OF ST. LOUIS, MISSOURI.

CASING FOR ELECTRIC SWITCHES.

SPECIFICATION forming part of Letters Patent No. 458,880, dated September 1, 1891.

Application filed June 22, 1891. Serial No. 397,105. (No model.)

*To all whom it may concern:*

Be it known that I, ADOLPH WISSLER, of the city of St. Louis and State of Missouri, have invented certain new and useful Improvements in Flush Casings for Electric Switches, of which the following is a full, clear, and exact description, reference being had to the accompanying drawings, forming a part hereof.

My invention relates to improvements in flush casings for electric switches; and it consists in the novel arrangement and combination of parts, as will be more fully hereinafter described, and designated in the claims.

In the drawings, Figure 1 is a perspective view of my complete invention with the lid removed but with the outline thereof shown in dotted lines. Fig. 2 is a vertical cross-section of the same, and Fig. 3 is a similar section taken on the line $x\ x$ of Fig. 2.

The object of my invention is to construct a flush casing for electric switches, the same being especially designed for house use, where a finished appearance is desired.

By the construction of casing I employ the same may be embedded in the wall and does not project therefrom and mar and disfigure the decorative appearance of said wall.

Referring to the drawings, 1 indicates a cylindrical shell, the same being provided on its upper edge with externally-projecting perforated ears 2, and also with V-shaped external projections 3. Said externally-projecting perforated ears 2 are situated diametrically opposite to each other, and the V-shaped external projections 3 are likewise situated.

4 indicates U-shaped recesses, which are formed in the upper edge of the shell 1. Said recesses have their inner edges cut away, so that the heads of the screws or nails 5 may be embedded in said recesses and not project in the inner space of the shell 1, thereby interfering in the least with the placing or removing of the switch from said shell.

6 indicates an inner peripheral flange, which answers as a seat for the electric switch 7. Said flange is provided with holes or perforations 8, through which nails or screws may pass for securing the switch 7 to the shell 1.

In place of employing the inner peripheral flange 6, I may have internally-projecting perforated ears, which are not illustrated, and have the same function. Said shell 1 is provided with a removable lid 9, the same being provided with an elongated perforation 10, in which the switch-handle 11 may move. It may be premised in this connection that Fig. 3 is a sectional view of my casing with a switch located therein. The lid 9 is circular in outline and has a sharpened edge 12, the same arising from the peripheral corner of the side of the lid being cut away. Said lid is also provided with perforations through which screws 13 may pass for securing said lid on shell 1. Said screws 13 are adapted to pass through the perforations formed in the lid 9, and are adapted to be screwed into the perforated ears 2. The V-shaped external projections 3 are to keep the shell 1 from turning.

Having fully described my invention, what I claim is—

1. As a new article of manufacture, the flush casing for electric switches, consisting of a shell 1, provided with externally-projecting perforated ears 2, situated diametrically opposite each other, with V-shaped external projections 3, likewise situated, with U-shaped recesses 4, and with a peripheral flange 6, and a lid 9, adapted to be secured to said shell or casing 1, substantially as set forth.

2. As a new article of manufacture, a flush casing for electric switches, consisting of a cylindrical shell 1, the same being provided with externally-projecting perforated ears 2, with V-shaped external projections 3, and with U-shaped recesses 4, the inner edges of which are cut away, so that the heads of the screws or nails may be embedded therein, and with an internal flange 6, which answers as a seat for the electric switch, and a lid 9, provided with an elongated perforation 10 and with a sharpened edge 12, substantially as set forth.

3. As a new article of manufacture, a flush casing for electric switches, consisting of a cylindrical shell 1, the same being provided with externally-projecting perforated ears 2, with V-shaped external projections 3, and with U-shaped recesses 4, the inner edges of which are cut away, so that the heads of the screws or nails may be embedded therein, and with an internal flange 6, which answers as a seat for the electric switch, and a lid 9, provided with an elongated perforation 10 and with perforations for the insertion of screws for securing the said lid to shell 1 and with a sharpened edge 12, substantially as set forth.

In testimony whereof I affix my signature in presence of two witnesses.

ADOLPH WISSLER.

Witnesses:
　　ED. E. LONGAN,
　　L. L. TRACEY.